Patented Mar. 27, 1951

2,546,220

UNITED STATES PATENT OFFICE 2,546,220

EMULSION POLYMERIZATION WITH A CATALYST COMPRISING A DIAZO THIOETHER AND A FERRICYANIDE

Charles F. Fryling, Phillips, Tex., and William B. Reynolds, Bartlesville, Okla., assignors to Phillips Petroleum Company, a corporation of Delaware No Drawing. Application April 24, 1947, Serial No. 743,718

20 Claims. (Cl. 260—84.1)

This invention relates to the polymerization of unsaturated organic compounds capable of undergoing an addition polymerization to form high molecular weight polymers. In one of its more specific aspects it relates to the polymerization of an aliphatic conjugated diene hydrocarbon, including substituted derivatives, either alone or in admixture with a monomer copolymerizable therewith, to form long chain polymers of the type known as synthetic rubbers. In a still more specific aspect it relates to the polymerization of a butadiene-1,3 hydrocarbon and a monomer copolymerizable therewith in an aqueous dispersion.

In the production of rubber-like elastomers various polymerization recipes have been developed in order to provide polymers of superior synthetic rubber properties. Variations in operating techniques have also been introduced in order to effect further improvements in the properties of the product. While the quality of synthetic rubber has been developed to a stage where many of the products manufactured from it are known to compare favorably with those made from natural rubber, there are certain inherent defects which must be overcome, if these synthetic materials are to give the satisfaction desired. For example, the poor retention of tensiles and extensibilities at elevated temperatures as well as the poor hysteresis-flex life balances are severe drawbacks, particularly when synthetic rubber is used in the manufacture of tires.

We have now found a method for effecting emulsion polymerization reactions in a manner such that the products show excellent retention of tensiles and extensibilities at elevated temperatures and the hysteresis-flex life balance is exceptionally good. The products also show superior tack, extrusion, and tear resistance properties, and are easily milled. While any suitable polymerization temperature may be employed, the preferred method comprises carrying out the polymerization at low temperatures, preferably at about 0° C. or below, in systems wherein diazo thioether-ferricyanide-mercaptan-alcohol compositions are employed. When operating at such low temperatures, and in accordance with this invention, new and improved polymers are produced which have not been possible through the use of prior art processes.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, nitrile, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene) bromoprene, methyl chloroprene (2-chloro-3-methyl-1,3-butadiene), and the like; aryl olefins such as styrene, various alkyl styrenes, p-chloro styrene, p-methoxy styrene, alpha-methyl styrene, vinyl naphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinyl furane, vinyl carbazole, vinyl acetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants.

One object of this invention is to polymerize unsaturated organic compounds.

Another object of this invention is to produce an improved synthetic rubber.

A further object of this invention is to produce a synthetic rubber by polymerization of monomeric material in aqueous emulsion at temperatures lower than ordinarily used.

Still another object of this invention is to increase the reaction rate in polymerizing unsaturated organic compounds in aqueous emulsion.

Another object of this invention is to provide a novel polymerization composition.

A further object of this invention is to use a diazo thioether in an improved manner in the polymerization of monomeric materials to produce synthetic rubber.

Other objects and advantages of this invention will become apparent, to one skilled in the art, from the accompanying disclosure and discussion.

The novel diazo thioether-ferricyanide-mercaptan-alcohol systems of this invention are advantageous in many respects. These compositions not only furnish initiating and promoting components of such activity that rapid conversion rates are realized but they provide a system which is operable at temperatures as low as about −30° C. When operating according to the method of this invention new and improved products are produced, the improvements being attributed to the fact that the low temperatures employed with the preferred recipes described herein effect the actual structure of resulting rubber molecules, thus imparting characteristics which are wholly unexpected.

While the mechanism of these low temperature reactions is obscure, one explanation for the difference in structure of the resulting rubber molecules, when a 1,3-diolefin is reacted, lies in the amount of 1,2-versus 1,4-addition which occurs during polymer formation, the amount of the 1,2-addition being less than that which normally occurs when the reactions are carried out at higher temperatures. In other words, as the amount of 1,2-addition decreases, the number of external double bonds in the product decreases. It is to be understood that this explanation is offered as a matter of clarity and that no limitations are intended.

The diazo thioether-ferricyanide-mercaptan-alcohol compositions employed in this invention comprise, in addition to a monohydric or polyhydric alcohol, initiator-modifier components including a diazo thioether of the water-soluble or oil-soluble type, a ferricyanide such as potassium ferricyanide, and a mercaptan or blend of mercaptans. It is also generally preferred to operate in the presence of an alkaline-reacting material, or mixture of alkaline-reacting materials, which may be incorporated with the other ingredients at the beginning of the reaction or, if preferred, added at intervals during the course of the polymerization. These act as buffers to aid in control of the pH of the emulsion. The alkaline-reacting substances which are applicable comprise compounds selected from the group consisting of alkali metal hydroxides, phosphates, pyrophosphates, and carbonates.

In order to illustrate the process of this invention the following polymerization recipe is presented:

| Ingredient | Parts by Weight |
|---|---|
| Butadiene | 70 |
| Styrene | 30 |
| Potassium Oleate (pH=10) | 5.0 |
| Mercaptan | variable |
| Diazo Thioether | variable |
| Potassium ferricyanide | 0.3 |
| Potassium hydroxide | 0.10 |
| Trisodium phosphate (Na$_3$PO$_4$·12H$_2$O) | 0.50 |
| Water | 175 |
| Glycerin | 75 |

The emulsified reactants are agitated by conventional means at a desired reaction temperature for the length of time required to effect the desired conversion after which the reaction is shortstopped and the latex treated with an antioxidant, coagulated, and dried. In some cases it is preferred to introduce a small quantity of an aqueous solution of the alkaline-reacting material at intervals, say at the end of a three-hour period and again after six hours, during the course of the reaction.

The diazo thioethers of the present invention have the general structural formula $$R—N=N—S—R'$$

wherein R is a member of the group consisting of aromatic and substituted aromatic radicals and R is a member of the group consisting of aromatic, substituted aromatic, cycloalkyl, substituted cycloalkyl, aliphatic, and substituted aliphatic radicals.

The diazo thio-ethers preferred for use as polymerization catalysts in accordance with the present invention are those in which both R and R' in the foregoing structural formula are aromatic or substituted aromatic groups. Examples of preferred compounds are substituted phenyl diazo thio-(naphthyl) ethers, phenyl diazo thio-(phenyl) ethers, naphthyl diazo thio-(phenyl) ethers, and naphthyl diazo thio-(naphthyl) ethers. Preferred substituent groups are the alkyl, alkoxy, aryloxy (e. g., phenoxy), carboxy, sulfo (SO$_3$H), halo, and nitro groups. Other substituents give diazo thio-ethers of varying degrees of usefulness. Among preferred compounds are those more fully described in an application of Reynolds and Cotten, Serial No. 641,866, filed January 17, 1946, now Patent 2,501,692, granted March 28, 1950, and are those represented by the formula $$Ar—N=N—S—R'$$
$$\underset{(X)_n}{|}$$

where Ar is an aryl group and X is a substituent selected from the group consisting of alkyl, alkoxy, aryl and aryloxy radicals, $n$ is an integer from one to four, and R' is a member of the group consisting of aromatic, substituted aromatic, cycloalkyl, substituted cycloalkyl, aliphatic, and substituted aliphatic radicals. Specific examples are the following: p-methoxy phenyl diazo thio-(2-naphthyl) ether, dimethyl phenyl diazo thio-(2-naphthyl) ether, dimethyl phenyl diazo thio-(p-methoxy phenyl) ether, p-methoxy phenyl diazo thio-(o-carboxy phenyl) ether, p-sulfo phenyl diazo thio-(2-naphthyl) ether, p-sulfo phenyl diazo thio-(p-tolyl) ether, 2-naphthyl diazo thio-(carboxy phenyl) ether, and the like, together with the ammonium and alkali metal salts of such compounds. Some of the more important compounds may be conveniently represented by the formula

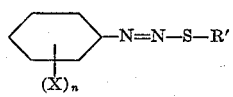

where X is a substituent selected from the group consisting of alkoxy and aryloxy radicals, $n$ is an integer from one to four, and R' is a member of the group consisting of aromatic, substituted aromatic, cycloalkyl, substituted cycloalkyl, aliphatic, and substituted aliphatic radicals.

The amount of diazo thioether used in the present process will generally range from about 0.05 to about 2.0 parts per 100 parts monomers with about 0.10 to about 0.50 part being most frequently preferred. The amount is governed by the operating temperature and the quantities of the other catalytic materials present.

The ferricyanides which are applicable for use in the additive compositions herein described are those of the alkali metals (including ammonium). However, potassium ferricyanide is most generally preferred. The amount of ferricyanide will generally be in the range of about 0.03 to about 1 part per 100 parts of monomeric material with a preferred range between about 0.05 and 0.5 part. The amount of this and other catalyst constituents in any particular case will, of course, be somewhat dependent upon the amounts of other constituents, and optimum amounts can be readily determined by one skilled in the art.

The mercaptans applicable for use in this invention comprise those of primary, secondary, and tertiary configuration containing from four to twenty carbons atoms per molecule with those containing from six to sixteen carbon atoms per molecule being most generally preferred. While tertiary mercaptans are most widely used and in many cases are most desirable, primary and secondary mercaptans are sometimes advantageous. It is also frequently preferred to employ blends of mercaptans such as, for example, blends of tertiary $C_{12}$, $C_{14}$, and $C_{16}$ mercaptans.

The quantity of mercaptan employed will vary depending upon the molecular weight and purity of the material as well as upon the results desired. For example, when tertiary $C_{12}$ mercaptan is used, the amount generally varies within the range of about 0.05 to about 1.40 parts per 100 parts of monomers charged, with the narrower range of about 0.10 to about 0.45 part being most frequently preferred.

The alcohols applicable in the catalyst systems herein described comprise water soluble compounds of both the monohydric and polyhydric types and include methyl alcohol, ethylene glycol, glycerin, erythritol, and the like. The amount of the alcoholic ingredient used in a polymerization recipe must be sufficient to prevent freezing of the aqueous phase and generally ranges from about 30 to about 120 parts per 100 parts of monomers charged with the narrower range of about 40 to about 90 parts being most frequently preferred. In most cases the amount of water employed is sufficient to make the total quantity of alcohol-water mixture equal about 250 parts. However, it is generally preferred that the emulsion be of an "oil in water" type, with the ratio of aqueous medium to monomeric material between about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

The emulsifying agent usually preferred is potassium oleate, although any other emulsifying agents which will produce favorable results in low temperature operations are applicable.

When operating according to the method of this invention temperatures for the polymerization reaction are below 0° C. and may range from about −30° C. to about 0° C. with a preferred range from about −15° C. to about −5° C.

Advantages of this invention are illustrated by the following examples. The reactants, and their proportions, and the other specific ingredients of the recipes are presented as being typical and should not be construed to limit the invention unduly.

*Example I*

A butadiene-styrene copolymer was prepared using the following recipe:

| Ingredient | Parts by Weight |
|---|---|
| Butadiene | 70 |
| Styrene | 30 |
| Potassium oleate, pH=10 | 5.0 |
| Mercaptan blend [1] | 0.40 |
| Potassium ferricyanide | 0.30 |
| 2-(p-Methoxybenzene diazo mercapto)-naphthalene | 0.30 |
| Trisodium phosphate ($Na_3PO_4 \cdot 12H_2O$) | 0.50 |
| Potassium hydroxide | 0.10 |
| Water | 175 |
| Glycerin | 75 |

[1] A blend of tertiary $C_{12}$, $C_{14}$, and $C_{16}$ mercaptans in a ratio of 3:1:1 parts by weight.

Polymerization was carried out at −10° C. using the conventional technique. A conversion of 40.2 per cent was reached after a reaction period of 46.2 hours.

*Example II*

The preparation of a butadiene-styrene copolymer was effected as in Example I. Polymerization was continued until a polymer having a Mooney value of 60 was produced. The product was compounded for evaluation according to the following formula:

| Ingredient | Parts by Weight |
|---|---|
| Polymer | 100.0 |
| EPC Channel black | 50.0 |
| Zinc oxide | 3.0 |
| Asphalt #6 | 6.0 |
| Sulfur | 1.7 |
| Santocure (N-cyclohexyl-2-benzothiazole-sulfenamide) | 0.80 |
| Stearic acid | 1.5 |

Comparisons were made with a standard GR-S control. The results obtained after the samples were cured 30 minutes are recorded below:

| | −10° Polymer | Control |
|---|---|---|
| Tensile, p. s. i., 80° F | 4,150 | 3,495 |
| Elongation, per cent, 80° F | 695 | 578 |
| Tensile, p. s. i., 200° F | 2,150 | 1,295 |
| Elongation, per cent, 200° F | 535 | 325 |
| Δ T, °F. (Hysteresis Heat Rise) | 74 | 74 |
| Resilience, per cent | 62.9 | 57.4 |
| Flex life at 210° F., M [1] | 120 | 15.8 |

[1] Thousands of flexures to failure.

Additional tests showed that the low temperature polymer had excellent extrusion and tear resistance properties and in these respects was also superior to the control.

Example III

A butadiene-styrene copolymer was prepared using the following recipe:

| | Parts by weight |
|---|---|
| Butadiene | 70 |
| Styrene | 30 |
| Water | 200 |
| Methanol | 50 |
| Potassium oleate (pH 10) | 5 |
| Potassium hydroxide | 0.1 |
| Normal $C_{16}$ mercaptan | 1.0 |
| Tertiary $C_{14}$ mercaptan | 0.182 |
| 2-(p-methoxybenzene diazo mercapto)-naphthalene | 0.3 |
| Potassium ferricyanide | 0.3 |
| Trisodium phosphate ($Na_3PO_4 \cdot 12H_2O$) | 0.5 |

Polymerization was carried out at $-10°$ C. using the conventional technique. A conversion of 60 per cent was reached after a reaction period of 16 hours.

Example IV

A polymerization was conducted exactly as in Example III except that in place of the butadiene-styrene monomer mixture, 100 parts isoprene was charged. A polyisoprene synthetic rubber of excellent properties was obtained.

Example V

The recipe of Example III was followed except that 0.5 part normal $C_{16}$ and tertiary $C_{14}$ mercaptans. Polymerization was carried out at $-10°$ C. using the conventional procedure. A conversion of 60 per cent was realized in 35 hours. The polymer exhibited exceptionally high tensile strength and resilience, coupled with extremely low hysteresis. Much previous work has already shown that a normal primary mercaptan of high molecular weight, such as the normal $C_{16}$ mercaptan used here, has no essential modifying effect on the polymer product, so that this run is an illustration of the successful production of an unmodified synthetic rubber polymer; the $C_{16}$ normal mercaptan acted as a component of the reaction initiator composition.

As will be evident to those skilled in the art, various modifications of this invention can be made, or followed, in the light of the foregoing disclosure and discussion, without departing from the spirit or scope of the disclosure or from the scope of the claims.

We claim:

1. In the polymerization of a monomeric material comprising a major amount of 1,3-butadient and a minor amount of styrene in an aqueous emulsion to produce a synthetic rubber, the improvement which comprises conducting said polymerization at a polymerization temperature between $-30$ and $0°$ C. in the presence of a composition comprising 0.05 to 2 parts of a diazo thioether having the fomular $R-N=N-S-R'$ where R is a member of the class consisting of aromatic radicals and R' is a member of the class consisting of aromatic, cycloalkyl and aliphatic radicals, 0.03 to 1 part of a water-soluble ferricyanide, 0.05 to 1.4 parts of a mercaptan having from six to sixteen carbon atoms per molecule, together with 30 to 120 parts of a water-soluble alcohol selected from the class consisting of methanol, ethylene glycol, glycerin and erythritol, all being parts by weight per 100 parts of monomeric material.

2. In the polymerization of a monomeric material comprising an unsaturated organic compound containing an active $CH_2=C<$ group and polymerizable in an aqueous emulsion in an aqueous emulsion, the improvement which comprises conducting said polymerization at a polymerization temperature between 0 and $-30°$ C. in the presence of a composition comprising 0.05 to 2 parts of a diazo thioether having the formula $R-N=N-S-R'$ where R is a member of the class consisting of aromatic radicals and R' is a member of the class consisting of aromatic, cycloalkyl and aliphatic radicals, 0.03 to 1 part of a water-soluble ferricyanide, 0.05 to 1.4 parts of an alkyl mercaptan having from six to sixteen carbon atoms per molecule, together with 30 to 120 parts of a water-soluble alcohol selected from the class consisting of methanol, ethylene glycol, glycerin and erythritol, all being parts by weight per 100 parts of monomeric material.

3. An improved process for the production of synthetic rubber, which comprises polymerizing at a polymerization temperature below $0°$ C. and in an aqueous emulsion a monomeric material, comprising a major amount of a 1,3-butadiene and a minor amount of an organic compound containing an active vinyl group and copolymerizable therewith in aqueous emulsion, in the presence of a catalytic composition comprising 0.1 to 0.5 part of a diazo thioether having the formula $R-N=N-S-R'$ where R is a member of the class consisting of aromatic radicals and R' is a member of the class consisting of aromatic, cycloalkyl and aliphatic radicals, 0.05 to 0.5 part of a ferricyanide of an alkali metal, 0.1 to 0.45 part of an alkyl mercaptan having between six and sixteen carbon atoms per molecule, together with 30 to 120 parts of a water-solube saturated alcohol selected from the class consisting of methanol, ethylene glycol, glycerin and erythritol all being parts by weight per 100 parts of said monomeric material, and recovering a polymeric material so produced.

4. The process of claim 3 in which said 1,3-butadiene is butadiene and said organic compound is styrene.

5. In a process for producing a synthetic rubber by copolymerizing in aqueous emulsion a monomeric material comprising a major amount of 1,3-butadiene and a minor amount of styrene, the improvement which comprises effecting said polymerization at a polymerization temperature between 0 and $-30°$ C. in the presence of a composition comprising 0.1 to 0.5 part of 2-(p-methoxybenzene diazo mercapto)-naphthalene, 0.05 to 0.5 part of potassium ferricyanide, 0.05 to 1.4 parts of an alkyl mercaptan having 12 to 16 inclusive carbon atoms per molecule, 40 to 90 parts of methyl alcohol, all parts being parts by weight per 100 parts of monomeric material, and with the ratio of aqueous medium including alcohol to monomeric material being between 1.5:1 and 2.75:1 by weight.

6. In a process for producing a solid plastic organic polymer by polymerizing in aqueous emulsion an unsaturated organic monomeric material containing an active $CH_2=C<$ group and polymerizable when dispersed in aqueous emulsion, the improvement which comprises effecting said polymerization at a polymerization temperature below $0°$ C. in the presence of a composition comprising 0.05 to 2 parts of an alkoxy phenyl diazo thio-(naphthyl) ether, 0.03 to 1 part of a water-soluble ferricyanide containing a monovalent cation, 0.05 to 1.4 parts of an alkyl mercaptan having 12 to 16 inclusive carbon atoms per molecule, and 30 to 120 parts of a saturated alcohol selected from the class consisting of methanol, ethylene glycol, glycerin and erythritol, all being parts by weight per 100 parts of said monomeric material, with the ratio of aqueous medium including said alcohol to monomeric material being between 1.5:1 and 2.75:1 by weight.

7. The process which comprises polymerizing at a polymerization temperature between $-30°$ and $0°$ C. a monomeric material comprising butadiene-1,3 in aqueous emulsion in the presence of 0.1 to 0.5 part 2-(4-methoxybenzene diazo mercapto) naphthalene, methanol in an amount up to 120 parts and sufficient to prevent freezing of the aqueous phase at said polymerization temperature, 0.03 to 1 part of a water-soluble ferricyanide, and an alkyl $C_{12}$ to $C_{16}$ mercaptan polymerization modifier, all parts being by weight per 100 parts by weight of said monomeric material.

8. The process which comprises polymerizing at a polymerization temperature below $0°$ C. a butadiene-1,3 hydrocarbon in aqueous emulsion in the presence of a diazo thioether having the structural formula R—N=N—S—R' wherein R is an aromatic radical and R' is a member of the group consisting of aromatic, cycloalkyl, and aliphatic radicals, methanol in an amount sufficient to prevent freezing of the aqueous phase at said polymerization temperature, a water-soluble ferricyanide, and an alkyl mercaptan polymerization modified having from four to twenty carbon atoms per molecule.

9. An improved process for the production of polymers of high molecular weight, which comprises polymerizing while in an aqueous dispersion a 1,3-butadiene and a vinyl aromatic compound copolymerizable therewith in an aqueous dispersion at a polymerization temperature below $0°$ C. and in the presence of catalytic amounts of a mixture comprising a diazo thioether having the formula R—N=N—S—R' where R is a member of the class consisting of aromatic radicals and R' is a member of the class consisting of aromatic, cycloalkyl, and aliphatic radicals, a water-soluble ferricyanide, and an alkyl mercaptan having from six to sixteen carbon atoms per molecule, together with a water-soluble alcohol selected from the class consisting of methanol, ethylene glycol, glycerin and erythritol in an amount sufficient to prevent freezing of the aqueous phase, together with an emulsifying agent, and recovering a polymeric material so produced.

10. The process of claim 9 in which said alcohol is methanol.

11. The process of claim 9 in which said alcohol is glycerin.

12. The process which comprises polymerizing a monomeric material comprising butadiene-1,3 in aqueous emulsion at a temperature between 0 and $-30°$ C. in the presence of 2-(4-methoxybenzene diazo mercapto) naphthalene, methanol in an amount sufficient to prevent freezing of the aqueous phase, a water-soluble ferricyanide, and an alkyl mercaptan containing from six to sixteen carbon atoms per molecule.

13. The process which comprises polymerizing a monomeric material comprising butadiene-1,3 in aqueous emulsion at a temperature between 0 and $-30°$ C. in the presence of 2-(4-methoxybenzene diazo mercapto) naphthalene, glycerin in an amount sufficient to prevent freezing of the aqueous phase, a water-soluble ferricyanide, and an alkyl mercaptan containing from six to sixteen carbon atoms per molecule.

14. The process which comprises polymerizing a monomeric material comprising butadiene-1,3 in aqueous emulsion at a temperature between 0 and $-30°$ C. in the presence of a diazo thioether having the formula R—N=N—S—R' where R is a member of the class consisting of aromatic radicals and R' is a member of the class consisting of aromatic, cycloalkyl, and aliphatic radicals, an alcohol selected from the class consisting of methanol, ethylene glycol, glycerin, and erythritol in an amount between 30 and 120 parts by weight per 100 parts of monomeric material, a water-soluble ferricyanide, and an alkyl mercaptan containing from six to sixteen carbon atoms per molecule.

15. The process of claim 2 in which said alcohol is methanol.

16. The process of claim 2 in which said alcohol is glycerin.

17. In a process for producing a solid plastic organic polymer by polymerizing in aqueous emulsion an unsaturated organic monomeric material containing an active $CH_2$=C< group and polymerizable when dispersed in aqueous emulsion, the improvement which comprises effecting said polymerization at a polymerization temperature between $0°$ C. and $-30°$ C. in the presence of a composition comprising 0.05 to 2 parts of a diazo thioether having the formula R—N=N—S—R' where R is a member of the class consisting of aromatic radicals and R' is a member of the class consisting of aromatic cycloalkyl and aliphatic radicals, 0.03 to 1 part of a water-soluble ferricyanide containing a monovalent cation, 0.05 to 1.4 parts of an alkyl mercaptan having four to twenty inclusive carbon atoms per molecule, and 30 to 120 parts of a saturated alcohol selected from the class consisting of methanol, ethylene glycol, glycerin and erythritol, all being parts by weight per 100 parts of said monomeric material, with the ratio of aqueous medium including said alcohol to monomeric material being between 1.5:1 and 2.75:1 by weight.

18. The process of claim 17 in which said alcohol is methanol.

19. The process of claim 17 in which said alcohol is glycerin.

20. The process which comprises polymerizing at a polymerization temperature between $-30$ and $0°$ C. a monomeric material comprising a 1,3-butadiene in aqueous emulsion in the presence of 0.1 to 0.5 part of a diazo thioether having the formula R—N=N—S—R' where R is a member of the class consisting of aromatic radicals and R' is a member of the class consisting of aromatic, cycloalkyl, and aliphatic radicals, a water-soluble alcohol selected from the class consisting of methanol, ethylene glycol, glycerin and erythritol in an amount up to 120 parts and sufficient to prevent freezing of the aqueous phase at said polymerization temperature, 0.03 to 1 part of a water-soluble ferricyanide, and an alkyl mercaptan having from four to twenty carbon atoms per molecule, all parts being by weight per 100 parts per weight of said monomeric material.

CHARLES F. FRYLING.
WILLIAM B. REYNOLDS.

(References on following page)

REFERENCES CITED

The following references are of record in the file of this patent:

UNITED STATES PATENTS

| Number | Name | Date |
|---|---|---|
| 2,251,156 | Nygaard | July 29, 1941 |
| 2,281,613 | Wolthan et al. | May 5, 1942 |
| 2,376,963 | Garvey | May 29, 1945 |
| 2,397,201 | Pfau | Mar 26, 1946 |
| 2,417,034 | Youker | Mar. 4, 1947 |

OTHER REFERENCES

Troyan, article in Rubber Age. August 1948, pages 585-595.